US008386645B2

(12) United States Patent
Balestriere et al.

(10) Patent No.: US 8,386,645 B2
(45) Date of Patent: *Feb. 26, 2013

(54) METHOD AND DEVICE TO PROCESS NETWORK DATA

(75) Inventors: Giacomo Balestriere, Putney (AU); Gilbert Rouse Woodman, III, San Jose, CA (US); John Ng, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/186,190

(22) Filed: Jul. 19, 2011

(65) Prior Publication Data

US 2011/0276722 A1    Nov. 10, 2011

Related U.S. Application Data

(63) Continuation of application No. 11/468,909, filed on Aug. 31, 2006, now Pat. No. 8,019,893.

(51) Int. Cl.
*G06F 15/16* (2006.01)
(52) U.S. Cl. ......... 709/246; 709/220; 709/232; 709/247
(58) Field of Classification Search .................. 709/246, 709/224, 230, 231, 208, 233, 249, 242, 236, 709/229, 247, 220, 232; 370/353, 216, 396, 370/410, 352, 286, 522, 529, 527, 401
See application file for complete search history.

(56) References Cited

U.S. PATENT DOCUMENTS

| 6,092,114 | A  | * | 7/2000 | Shaffer et al. | 709/232 |
|---|---|---|---|---|---|
| 7,203,740 | B1 | * | 4/2007 | Putzolu et al. | 709/220 |
| 2001/0028467 | A1 | * | 10/2001 | Ishihara | 358/1.9 |
| 2002/0065900 | A1 | * | 5/2002 | Dor et al. | 709/217 |
| 2002/0131404 | A1 | * | 9/2002 | Mehta et al. | 370/352 |
| 2003/0171953 | A1 | * | 9/2003 | Narayanan et al. | 705/2 |
| 2004/0042422 | A1 | * | 3/2004 | Pfeiffer | 370/328 |
| 2004/0093430 | A1 | * | 5/2004 | Thomas | 709/245 |
| 2004/0123275 | A1 | * | 6/2004 | Brown et al. | 717/136 |
| 2004/0205562 | A1 | * | 10/2004 | Rozek et al. | 715/513 |
| 2004/0205671 | A1 | * | 10/2004 | Sukehiro et al. | 715/532 |
| 2005/0265342 | A1 | * | 12/2005 | Thakor | 370/389 |
| 2006/0098642 | A1 | * | 5/2006 | Mallya et al. | 370/389 |
| 2006/0165051 | A1 | * | 7/2006 | Banerjee et al. | 370/351 |
| 2006/0182100 | A1 | * | 8/2006 | Li et al. | 370/389 |
| 2006/0200753 | A1 | * | 9/2006 | Bhatia et al. | 715/505 |

(Continued)

OTHER PUBLICATIONS

Atinav Press Release—Atinav Launches aveAccess JAVA and Jini-Based Software Enables Any Client Device to Access Internet Resource, Aug. 1, 2000.*

(Continued)

*Primary Examiner* — Barbara Burgess
(74) *Attorney, Agent, or Firm* — Schwegman, Lundberg & Woessner, P.A.

(57) ABSTRACT

A method and network device to process network data is described. The method may comprise, when the network device is unable to process the network data, communicating a translation request including data for translation to a remote translator. The translation request may identify a format into which the network data is to be translated. Thereafter, the method comprises receiving translated data from the translator and processing the translated data. Further, a method and translation device to provide translated data to a network device is described. The method may comprise receiving at a translator a translation request from at least one network device wherein the translation request includes data to be translated. Thereafter, the method may identify a data schema associated with the received data and translate the received data into translated data corresponding to the identified data schema. The translated data is then communicated to the network device.

24 Claims, 5 Drawing Sheets

U.S. PATENT DOCUMENTS

2008/0059406 A1    3/2008    Balestriere et al.

OTHER PUBLICATIONS

U.S. Appl. No. 11/468,909, Final Office Action mailed Sep. 24, 2010, 38 pgs.

U.S. Appl. No. 11/468,909, Advisory Action mailed Feb. 22, 2011, 2 pgs.

U.S. Appl. No. 11/468,909, Final Office Action maile Dec. 9, 2010, 39 pgs.

U.S. Appl. No. 11/468,909, Non-Final Office Action mailed Sep. 17, 2009, 28 pgs.

U.S. Appl. No. 11/468,909, Non-Final Office Action mailed Mar. 19, 2010, 35 pgs.

U.S. Appl. No. 11/468,909, Notice of Allowance mailed Apr. 19, 2011, 17 pgs.

U.S. Appl. No. 11/468,909, Response filed Feb. 9, 2011 to Final Office Action mailed Dec. 9, 2010, 15 pgs.

U.S. Appl. No. 11/468,909, Response filed Jul. 19, 2010 to Non Final Office Action mailed Dec. 17, 2009, 18 pgs.

U.S. Appl. No. 11/468,909, Response filed Nov. 23, 2010 to Final Office Action mailed Sep. 24, 2010, 16 pgs.

U.S. Appl. No. 11/468,909, Response filed Dec. 17, 2009 to Non Final Office Action mailed Sep. 17, 2009, 14 pgs.

"Atinav Launches aveAccess JAVA and Jim-Based Software Enables Any Client Device to Access Internet Resource," Press Release, www.atinav.com (Aug. 1, 2000) 2 pgs.

* cited by examiner

METHOD AND DEVICE TO PROCESS NETWORK DATA

CLAIM OF PRIORITY

This application is a continuation of and claims the benefit of priority under 35 U.S.C. §120 to U.S. patent application Ser. No. 11/468,909, entitled "METHOD AND DEVICE TO PROCESS NETWORK DATA," filed on Aug. 31, 2006, now U.S. Pat. No. 8,019,893, issued on Sep. 13, 2011, which is hereby incorporated by reference herein in its entirety.

FIELD

This application relates to a method and device to process network data.

BACKGROUND

In a number of network applications, different network devices routers and switches) may use different schemas (e.g. XML data schemas) to represent data. Thus, in order for a network device to translate data between different schemas, each schema needs to be supported on the network device. Accordingly, a network device may require embedded data to a large number of data schemas which is not memory efficient. Even if the network device supports a large number of data schemas, it may still be required to process data corresponding to a schema that is not supported on the network device. Similarly, when a network device sends a data message to another network device (e.g., a console) it may be required to support the format that the other network device supports.

BRIEF DESCRIPTION OF DRAWINGS

The present invention is illustrated by way of example and not limitation in the figures of the accompanying drawings, in which like references indicate similar elements and in which.

DETAILED DESCRIPTION

In the following description, for purposes of explanation, numerous specific details are set forth in order to provide a thorough understanding of embodiments of the present invention. It will be evident, however, to one skilled in the art that the present invention may be practiced without these specific details. In an example embodiment, a method, device and a system are described to process translate) data from one format to another format. For example, data associated with (or corresponding to) one data schema may be translated data associated another data schema. Thus, in an example embodiment, a number of embedded schemas provided on a network device may be reduced by using an off-device network application to convert the input data (e.g., packet data associated with a data schema not supported by the network device) to translated data, corresponding to an embedded data schema supported by the network device.

Figure 1:
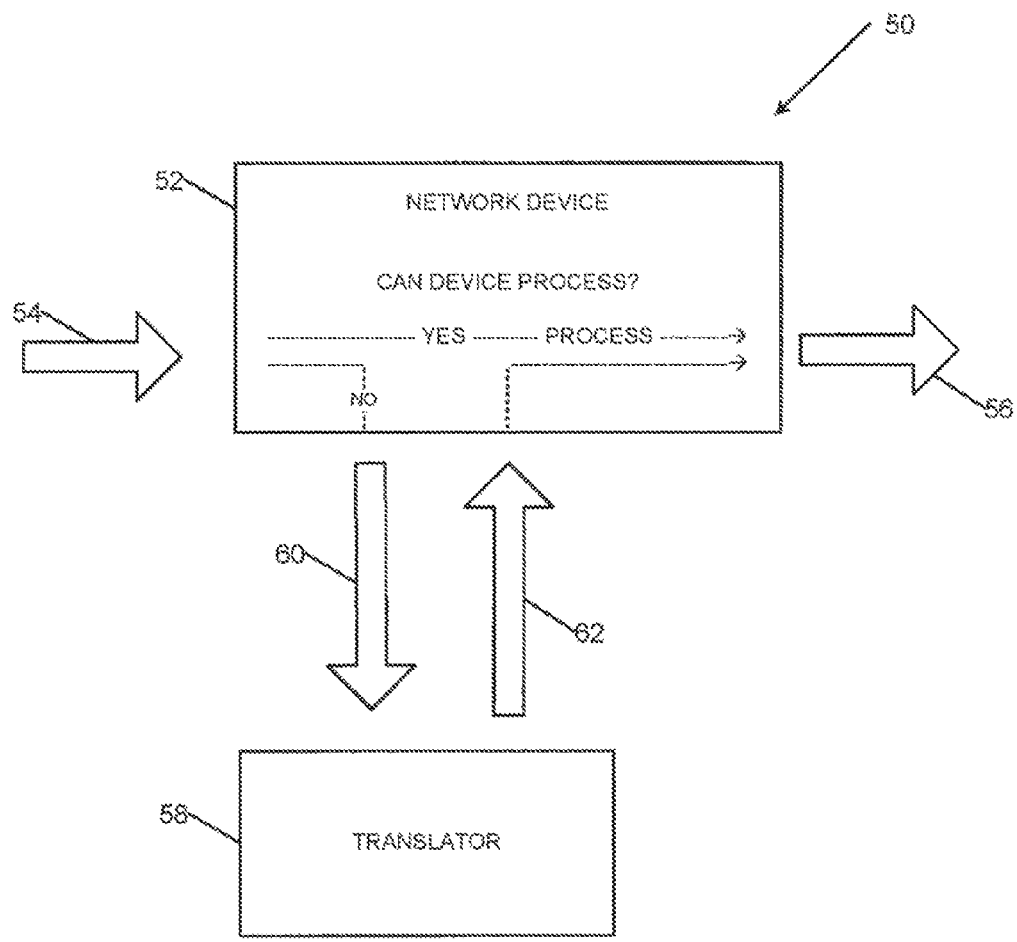
FIG. 1 shows a high level block diagram of a system, in accordance with an example embodiment, to process data at a network device.

Referring to FIG. 1, reference 50 generally indicates a system, in accordance with an example embodiment, to process data in a network device 52. For example, the network device 52 may be a router, switch, or any other network device that processes network traffic. Thus, the network device 52 may receive data (e.g., network traffic such as messages including or excluding data, datagrams or packets, or the like) as shown by arrow 54, process the data, and communicate processed data to another network device as shown by arrow 56.

The system 50 is also shown to include a translator 58 communicative coupled to the network device 52. In an example embodiment, the network device 52 communicate a translation request to the translator 58 to translate data in a first form or format into data in a second form or format. For example, data received by the network device 52 may be associated with a schema that is unknown to the network device 52. A translation request including the unknown data (see arrow 60) may then be communicated to the translator 58, which, from example may then translate the data into a format or schema known to the network device 52 (see arrow 62). Thus, the translation request from the network device 52 to the translator 58 may allow the network device 52 to process multiple XML schemas. In addition to, or instead of translating data between multiple XML schemas, in an example embodiment, the translator 58 may translate data which is to be output by the network device 52 to a console in an appropriate format required by the console.

Figure 2:
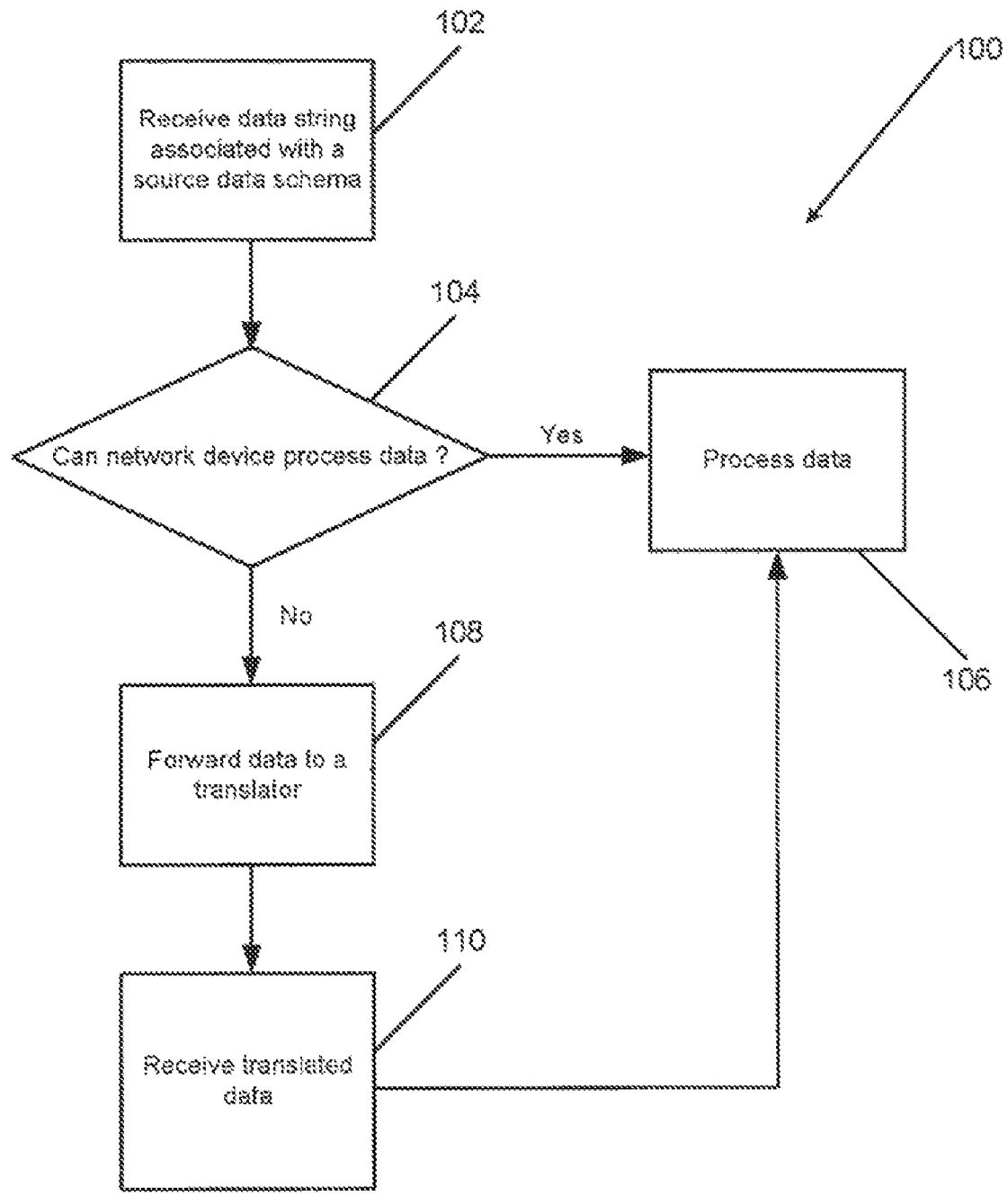
FIG. 2 shows a flow chart of a method, according to an example embodiment, for obtaining translated data at a network device.

FIG. 2 shows a flow chart of a method 100, according to an example embodiment, for obtaining translated data at a network device. The method 100 may, for example, be performed in the system 50 shown in FIG. 1.

The method 100, in an example embodiment, comprises receiving network data associated with a source data schema (a first data schema) as indicated by block 102. The method 100 may then comprise determining if the network device (e.g., the network device 52) can process the data (see block 104). For example, if the network data corresponds to a data schema stored (e.g., embedded) at the network device, then the network device may process the data as required (see block 106).

However, the network device may require translation of the data from a source data schema (a first data schema) to another data schema (a target data schema). In an example embodiment, a data schema version tag may be provided to identify an associated data schema. If the network device is unable to process the data, or requires the data to be translated to data associated with another data schema, the method 100 may then proceed to block 108. In block 108, the network device communicates the data for translation to a translator (e.g., the translator 58 shown in FIG. 1), which then translates the data associated with (or corresponding to) the first data schema to translated data associated with (or corresponding to) the second data schema.

Information specific to the network device may also be forwarded to the translator. Examples of such information include a device identifier for the network device, a software version for the embedded applications running on the network device (e.g., and Internetwork Operating System (LOS) version), the target data schema that network device requires the data to be converted to, or the like.

In an example embodiment, the translator the translator 58) may be a dedicated device including a translation table (for example, a look up table) to translate data in the source data schema (first data schema) to corresponding data in the target data schema (second data schema). The translator may provide translation functionality to multiple network devices. In an example embodiment, the translator can be incorporated into a standard network device, such as a router, gateway, switch, etc.

As shown at block 110, the method 100 further comprises receiving the translated data from the translator whereafter, as shown at block 106, the network device may process the data.

In an example embodiment, the method 100 may result in the network device only having to support one data schema. For example, if XML is sent to the device which may be defined by an unknown schema, the method 100 enables a translation request to be sent off-device to have the data translated into a different data schema (e.g., a schema corresponding to that provided (e.g., embedded) on the network device).

For example, the contents of the translation request (e.g., off-device) may comprise:

```
<reqd> original XML
<reqd> desired schema to convert to
<optional> IOS version
<optional> hardware inventory of the network device
```

In addition to, or instead of converting data between two different data schemas, the method 100 may also change the format of data (e.g., convert BNF grammar text streams into other formats). For example, the network device may be a router or switch running IOS software, which can readily process an associated CLI (command line interface) that provides a fixed set of multiple-word commands for the network device. In this example embodiment an output destined for a console, syslog, or the like may be translated or converted into an appropriate format (e.g., for display on a console).

In an example off-device translation request, the data corresponding to the original or first source data schema (e.g., XML) and the identity of the second schema or target data schema, may be mandatory fields. Optional fields in the translation request may be device-specific and may include an IOS version that it is running on the network device, a hardware inventory for the network device, and/or other network device-related information. In this example, the translator may understand both schema translation and hardware inventory, to enable it to deal with hardware in different slots and do port numbering correctly. As the example information provided by way of example above may be sufficient for the translator to perform the translation functionality it may thus be stateless and need not store any data or information about the network devices it services. In an example embodiment, translation may thus be done on-the-fly using a translation table that is device independent.

As indicated above, the method 100 may result in the network device only having to support one data schema (or at least a limited number of data schemas). In an example embodiment, the data schema on the network device may comprise a low level schema embedded in the network device, for example, a Cisco Networking Services (CNS) enhanced security configuration header.

In an example embodiment, a network device running IOS may utilize the following XML data schema:

```
<MY DATA MODEL>
    <FIRST INT> INT EΦ </FIRST INT>
    <IP ADD> IP ADD 1.2.3.4 255.0 </IP ADD>
    <IP MASK> 255.255.255.0 </IP MASK>
< MY DATA MODEL >
```

In an example embodiment, the network device may determine whether data to be processed corresponds to a source data schema (or source data format) or requires conversion to a target data schema (a target data format). For example, the target data schema may be IOS CLI. The network device may then forward data to a translator associated with the network device to translate the data into translated data corresponding to the target data schema. The network device may then receive the translated data and communicate it to a console. As the data received by the console is in a suitable format for the console, a screen scraping application may no longer be required to capture the data. In an example embodiment, the corresponding translated data may be as follows:

```
<cfg data>
    <CLI> INT EΦ </CLI>
    <CLI> IP ADD 1.2.3.4 255.0 </CLI>
</cfg data>
```

Figure 3:
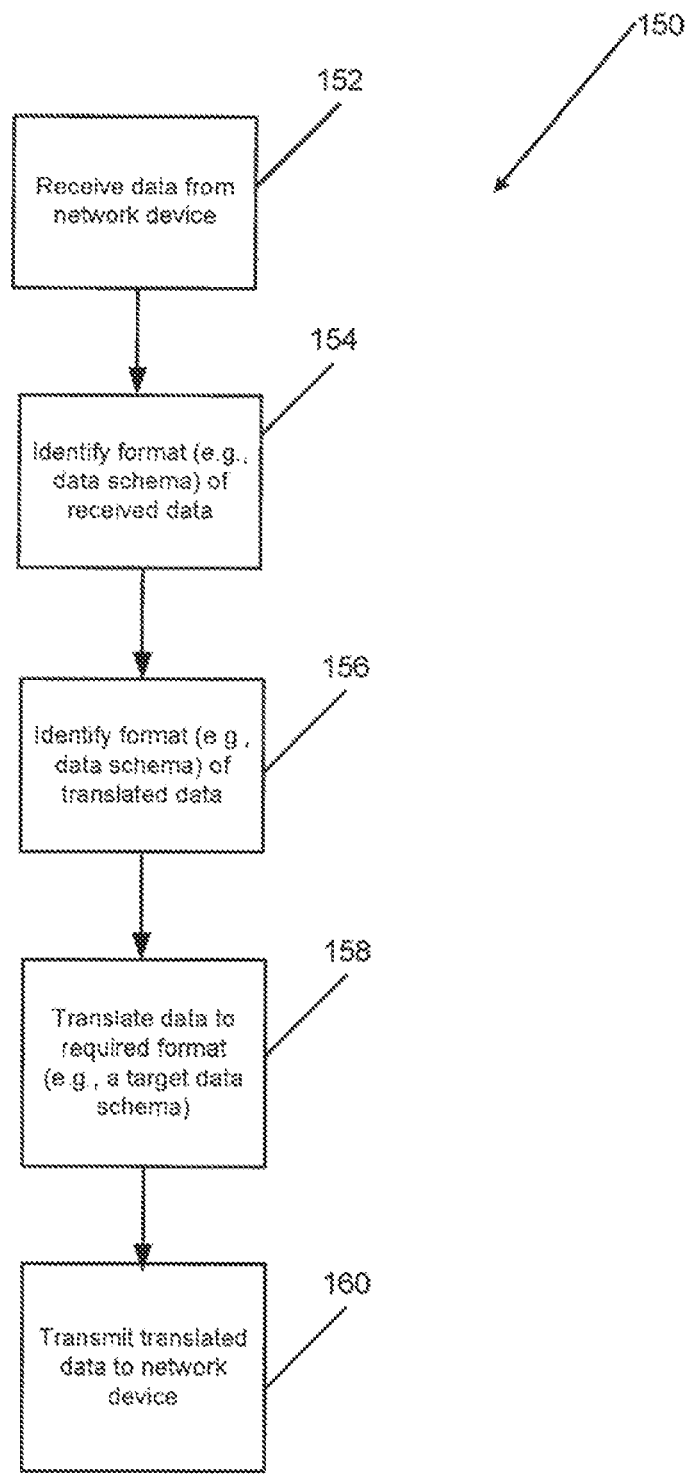
FIG. 3 shows a flow chart of a method, according to an example embodiment, for providing translated data to a network device.

A flow chart of an example embodiment of a method 150 for providing translated data to a network device (e.g., the network device 52) is shown in FIG. 3. As shown it block 152, the method 150 receive data from a network device and identify a format of the received a data (see block 154 and example identification module 228 in FIG. 4). For example, the method 150 may identify a data schema (e.g., an XML data schema) corresponding to the current format of the data). Thereafter, as shown it block 156, the method 150 may identify a format into which the received data is to be converted into (e.g., data corresponding to a different XML data schema). The method 150 then translates or converts the received data into translated data corresponding to a different XML data schema which the network device is capable of processing (see block 158). The translated data is then communicated to the network device as shown it block 160.

Figure 4:
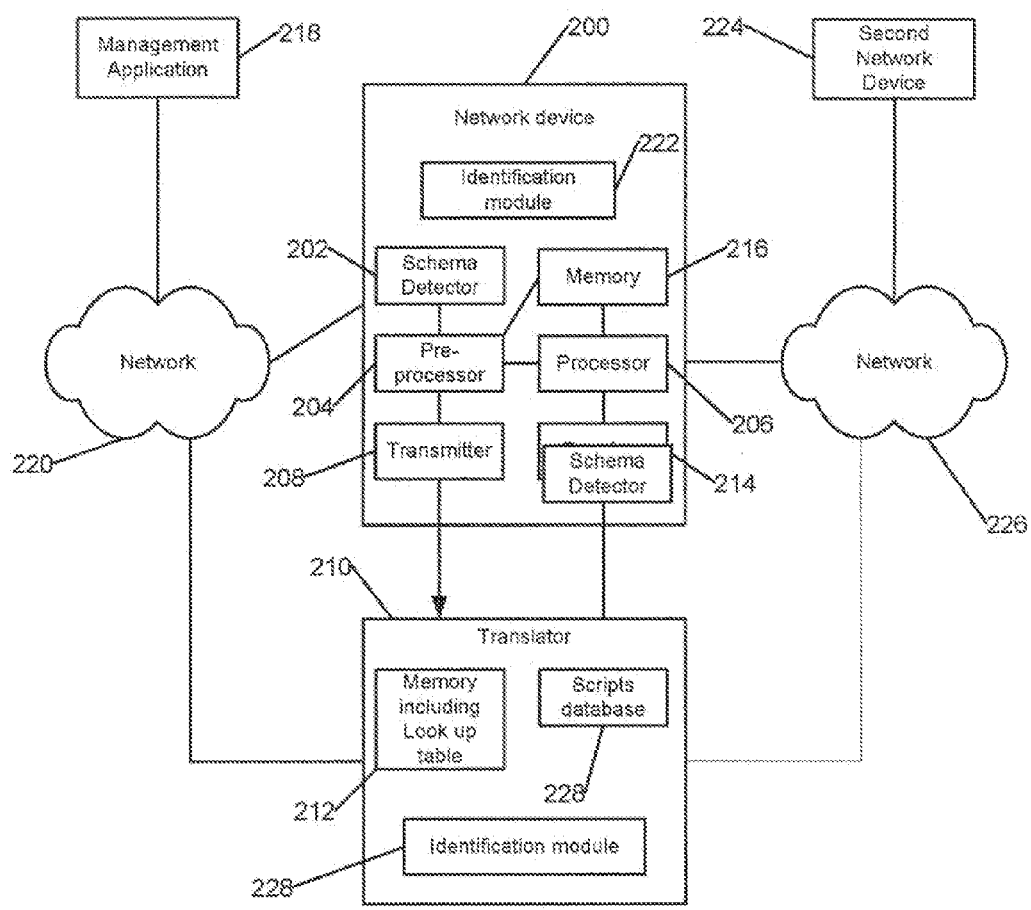
FIG. 4 shows a schematic diagram of a system including a network device and translator, both in accordance with an example embodiment, to translate data in first data schema to data in a second data schema.

FIG. 4 shows a schematic diagram of a system 200 including a network device 201 and translator 210, both in accordance with an example embodiment, to translate data in first data schema to data in a second data schema. The example device 201 may, for example, implement the method 100 as described above by way of example. It is however to be appreciated that deployment of the method 100 is not restricted in any way whatsoever to the configuration shown in FIG. 2. The device 201 may be a router, switch or any other network device configured to process packets in a data communications network.

The device 201 may comprise a schema compatibility detector (or identifier) 202 that may be controlled by a preprocessor 204 to determine whether incoming or source data corresponds to a target data schema that applications embedded within the network device 201 can process. In an example embodiment, the applications may be run by a primary processor 206 in the device 201.

If the incoming data corresponds to, or is compatible with one or more data schemas supported by the network device, then the preprocessor 204 may simply forward the source data to the primary processor 206 for processing (e.g., see also FIG. 1). If, however, the source data does not correspond to or is not compatible with the resident data schema(s), then the network device 201 may, utilizing a transmitter 208, forward the source data to an off-device translator 210 (e.g., see also translator 58 in FIG. 1) associated with the network device 201 to translate data corresponding to the source data schema to data compatible with the target data schema. In an example embodiment, the translator 210 may comprise a look up table 212 to carry out the translation. Although the translator 210 is shown as being a local device coupled to the network device 201, the translation service may be run on a network appliance that may be accessed by URL requests. Further, it should be noted that multiple network devices 201 may communicate with the translator 210. For example, a second network device 224 may communicate with the translator 210 via a network 226.

The network device 201 may further comprise a receiver 214 to receive the translated data from the translator 210 and to forward it to the primary processor 206 for processing.

In an example embodiment, the network device 201 comprises memory 216 to store device-specific information for the network device 201. This information may be sent together with the source data to the translator 210 for translation, as described above.

In an example embodiment, a data schema provided on the network device 201 may be received from a management application 218 via a network 220. In order to conserve resources on the network device 201, the network device 201 may be provisioned or configured to process data corresponding to only a few, or even a single, data schema. When the network device 201 in unable to process the data (e.g., because it corresponds to a different data schema of format), it may then communicate a translation request to the translator 210 to translate the data corresponding one data schema to data corresponding to another data schema. For example, the memory 216 may store the data schema (or a limited number of data schemas) for on-device processing. An identification module 228 may be provided to identify if the network device 201 is capable of processing the received data and thus determine if the data should be sent to the translator 210 for translation or conversion.

In an example embodiment, the management application 218 may also provision or configure the translator 210 to translate data associated with plurality of different schemas. For example, the management application 218 may configure (or update) the took up table 212 so that data associated with a first data schema may be translated or converted to data associated with a second data schema.

The embodiments described herein may also be used to convert BNF grammar text strings into other formats. In an example embodiment, the translator 210 may convert text output in a BNF grammar format to another format. In an example embodiment, the translator 210 may comprise a database 228 of scripts (e.g., awk, sed) to convert BNF text strings into a desired format. The script(s) may be executed in order to generate the required translation or formatting of the data string. A data structure may, for example, use three keys to return a script capable of converting the input data string. The keys may comprise an IOS version, an application identification, and an operation name, for example, 12.2, exec, show arp, or the like. The returned value may be a script to verify and convert the BNF input data string.

In an example embodiment, the string may be converted at the translator 210 and the result may then be sent back to the originator of the request. Thus, the network device 201 may send a request to the translator 210 to convert the BNF text strings and receive converted or translated strings that are then sent to a console. In an example embodiment, the translation may be done using Regular expressions. However, the conversion can be done at the network device 201 in which case the translator 210 returns an appropriate script which is then executed at the network device.

As in the case of the conversion of data between different data schemas, the conversion of the format of the data may be stateless. Thus, no additional state (or any device specific or historical information) need be maintained at the translator (e.g., a translation server) to receive a translation request, process the request, and send a response.

In an example embodiment, the method 100 and device 201 described above may be used to send multicast transmissions to a plurality of network devices, wherein each network device may have slight variations in the schema which is embedded in the device. For example, a management application may send the same request to a plurality of network devices of the type described above, with each network device now having the ability to process the request even if the appropriate schema or format of the data received is unknown to the network device. In an example embodiment, a network configuration application may configure a set of network devices concurrently. The application may thus build an XML configuration (or limited number of XML configurations) and send it to all the network devices for installation thereon.

Figure 5:
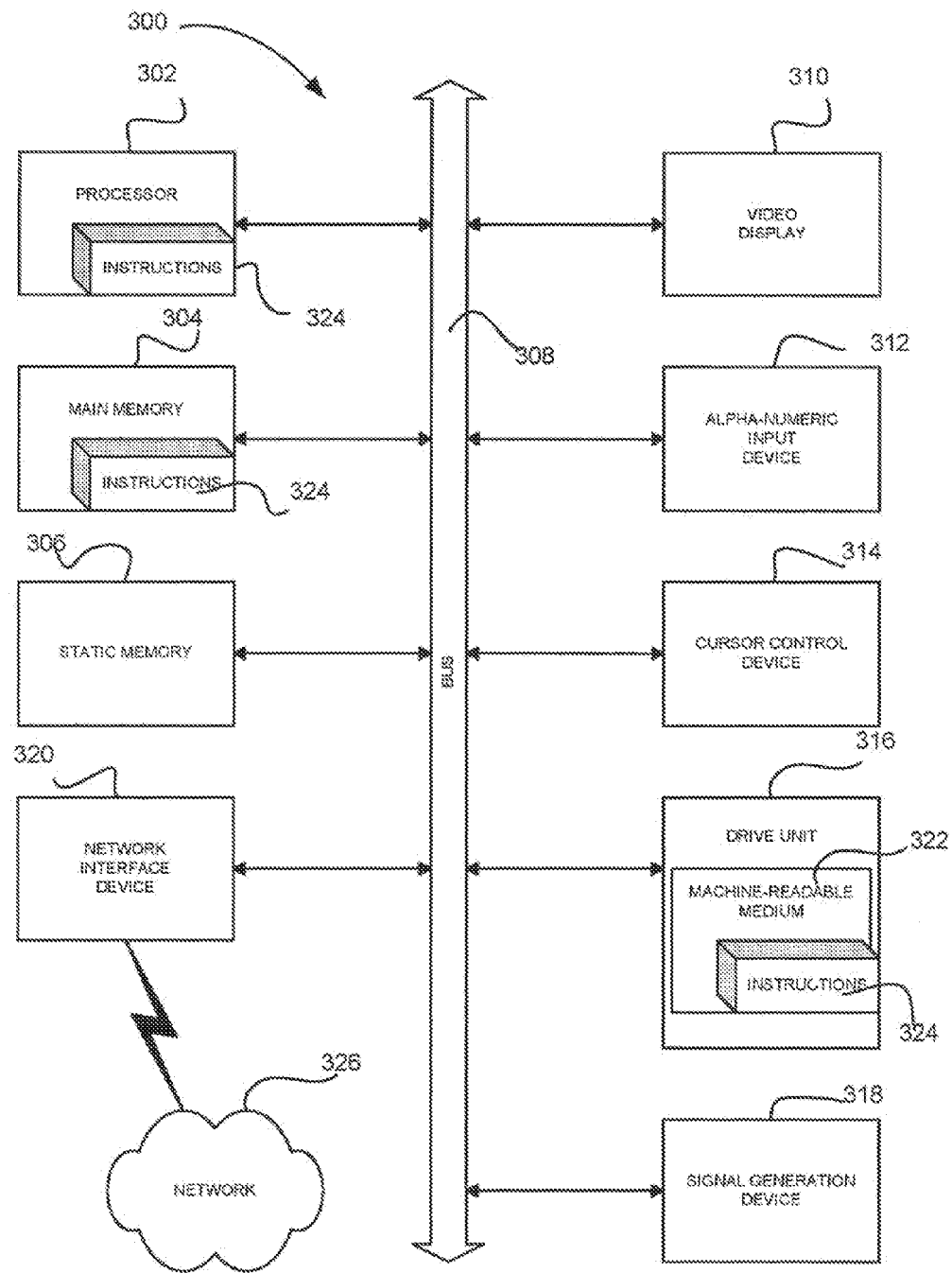
FIG. 5 shows a diagrammatic representation of machine in the example form of a computer system within which a set of instructions, for causing the machine to perform any one or more of the methodologies discussed herein, may be executed.

FIG. 5 shows a diagrammatic representation of machine in the example form of a computer system 300 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, white only a single machine is illustrated, the term "machine" shall also be taken to include any collection of machines that individually or jointly execute a set (or multiple sets) of instructions to perform any one or more of the methodologies discussed herein.

The example computer system 300 includes a processor 302 (e.g., a central processing unit (CPU), a graphics processing unit (GPU) or both), a main memory 304 and a static memory 306, which communicate with each other via a bus 308. The computer system 300 may further include a video display unit 310 (e.g., a liquid crystal display (LCD) or a cathode ray tube (CRT)). The computer system 300 also includes an alphanumeric input device 312 (e.g., a keyboard), a user interface (UI) navigation device 314 (e.g., a mouse), a disk drive unit 316, a signal generation device 318 (e.g., a speaker) and a network interface device 320.

The disk drive unit 316 includes a machine-readable medium 322 on which is stored one or more sets of instructions and data structures (e.g., software 324) embodying or utilized by any one or more of the methodologies or functions described herein. The software 324 may also reside, completely or at least partially, within the main memory 304 and/or within the processor 302 during execution thereof by the computer system 300, the main memory 304 and the processor 302 also constituting machine-readable media.

The software 324 may further be transmitted or received over a network 326 via the network interface device 320 utilizing any one of a number of well-known transfer protocols (e.g., HTTP).

While the machine-readable medium 322 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention, or that is capable of storing, encoding or carrying data structures utilized by or associated with such a set of instructions. The term "machine-readable medium" shall accordingly be taken to include, but not be limited to, solid-state memories and optical and magnetic media.

Although an embodiment of the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A method for processing network data in a network device, the method comprising:
   receiving the network data at the network device, the network device being a router, a bridge, or a switch;
   when the network device is unable to process the network data in order to route or switch the network data, communicating a translation request to a remote translator, the translation request including:
   the network data to be translated,
   an identifier of a format into which the network data is to be translated, and
   at least one of an identifier of an Internetwork Operating System (IOS) version provided on the network device or a hardware inventory of the network device,
   receiving translated data from the translator; and
   processing the translated data.

2. The method of claim 1, wherein the network data is associated with a data schema not provided on the network device.

3. The method of claim 1, wherein the network data is XML data, the translation request including the XML data received by the network device, and the identifier of the format into which the network data is to be translated comprising a selected schema to which the XML is to be converted.

4. The method of claim 1, wherein the network data comprises an input string, the method further comprising:
   receiving at least one script from the translator responsive to communication of the translation request to the translator; and
   executing the script on the network device to translate the string to a selected format.

5. The method of claim 4, wherein the script is to convert BNF strings to at least one other format.

6. The method of claim 1, further comprising the operation of identifying whether the network device is unable to process the network data responsive to receiving the network data at the network device.

7. The method of claim 1, wherein the translation request is initiated by the network device and is communicated from the network device via a network to an off-device translator.

8. The method of claim 1, further comprising identifying the translator using a Uniform Resource Locator (URL).

9. The method of claim 1, further comprising:
   receiving at least one data schema from a network management application;
   storing the at least one data schema on the network device; and
   communicating data not corresponding to the at least one schema to the translator for translation into data corresponding to the at least one data schema provided on the network device.

10. A method for providing translated data to a network device, the method comprising:
    receiving at a translator at least one script from a network management device via a network;
    storing the at least one script at the translator for translating an input data string to another data string;
    receiving at the translator a translation request from at least one network device, the translation request including data to be translated in order for the at least one network device to process the data to be translated for a routing or switching operation, the data to be translated including the input data string which is a string output from an IOS;
    identifying a first data format associated with the received data;
    identifying a second data format associated with the network device;
    translating the received data corresponding to the first data format into translated data corresponding to the second data format, the translating including translating the input data string to the other data string; and
    communicating the translated data to the network device.

11. The method of claim 10, in which the first and second data formats are data schemas, the method further comprising:
    receiving, via a network, a plurality of data schemas from a network management device; and
    storing the data schemas at the translator for processing translation requests received from the plurality of network devices.

12. The method of claim 11, in which the data schemas are XML schemas to translate XML data received from the plurality of network devices.

13. A device to process network data, the device comprising:
    an identification module to identify when translation is required for the network data in order to perform a routing or switching operation on the network data;
    a transmitter to communicate a translation request for translation to a remote translator, the translation request including:
    the network data to be translated,
    an identifier of a format into the which the network data is to be translated, and
    at least one of an identifier of an Internetwork Operating System (IOS) version provided on the network device or a hardware inventory of the network device
    a receiver to receive translated data from the translator; and
    a processor to process the translated data.

14. The device of claim 13, wherein the network device is configured to receive the network data, the identification module is configured to identify when the network device is unable to process the network data, and the transmitter is configured to communicate the received network data to the translator when the network device is unable to process the received network data.

15. The device of claim 13, wherein the translation request is initiated by the network device and is communicated from the network device via a network to an off-device translator.

16. The device of claim 13, wherein the transmitter is to identify the translator utilizing a URL.

17. The device of claim 13, wherein the device is configured to receive at least one data schema from a network management application, the device including memory to store the at least one data schema on the network device, the device being configured to communicate data not corresponding to the at least one data schema to the translator for translation into data corresponding to the at least one data schema provided on the network device.

18. The device of claim 13, in which the device is a router or a switch.

19. The device of claim 13, wherein the data for translation is associated with a data schema not provided on the network device.

20. The device of claim 13, wherein the network data is XML data and the device is configured to include in the translation request the XML data received by the network device, and wherein the identifier of the format into which the network data is to be translated comprises a selected schema to which the XML is to be converted.

21. A translation device to provide translated data to a network device, the device comprising:
- a receiver to receive from a network management device via a network at least one script to translate an input data string to another data string, the receiver further to receive a translation request from at least one network device, the translation request including data to be translated in order for the at least one network device to process the data to be translated for a routing or switching operation, and the data to be translated including the input data string which is a string output from an IOS;
- a memory to store the at least one script;
- an identification module to identify a first data format associated with the received data and a second data format associated with the network device;
- a translator to translate the received data corresponding to the first data format into translated data corresponding to the second data format, the translating including translating the input data string to the other data string; and
- a transmitter to communicate the translated data to the network device.

22. The device of claim 21, wherein the receiver is configured to receive from the network management device a plurality of data formats corresponding to a plurality of data schemas, the plurality of data formats including the first data format and the second data format, the memory to store the data schemas to process translation requests received from a plurality of network devices.

23. A non-transitory machine-readable medium embodying instructions which, when executed by a machine cause the machine to:
- receive network data at the machine, the machine being a network device which is a router, a bridge, or a switch;
- when the network device is unable to process the network data in order to route or switch the network data, communicate a translation request to a remote translator, the translation request including:
  - the network data to be translated,
  - an identifier of a format into which the network data is to be translated, and
  - at least one of an identifier of an Internetwork Operating System (IOS) version provided on the network device or a hardware inventory of the network device,
- receive translated data from the translator; and
- process the translated data.

24. A non-transitory machine-readable medium embodying instructions which, when executed by a machine cause the machine to:
- receive at least one script from a network management device via a network;
- store the at least one script at the translator for translating an input data string to another data string;
- receive a translation request from at least one network device, the translation request including data to be translated in order for the at least one network device to process the data to be translated for a routing or switching operation, the data to be translated including the input data string which is a string output from an IOS;
- identify a first data format associated with the received data;
- identify a second data format associated with the network device;
- translate the received data corresponding to the first data format into translated data corresponding to the second data format, the translating including translating the input data string to the other data string; and
- communicate the translated data to the network device.

* * * * *

UNITED STATES PATENT AND TRADEMARK OFFICE
CERTIFICATE OF CORRECTION

PATENT NO. : 8,386,645 B2  
APPLICATION NO. : 13/186190  
DATED : February 26, 2013  
INVENTOR(S) : Balestriere et al.

Page 1 of 1

It is certified that error appears in the above-identified patent and that said Letters Patent is hereby corrected as shown below:

In the Claims

In column 8, line 61, in claim 13, after "device", insert --;--

Signed and Sealed this
Fifth Day of November, 2013

Teresa Stanek Rea
*Deputy Director of the United States Patent and Trademark Office*